United States Patent
Francker et al.

(10) Patent No.: US 8,078,612 B2
(45) Date of Patent: Dec. 13, 2011

(54) PROVIDING DATA BASED ON LANGUAGE CHOICE

(75) Inventors: Soren Francker, Kirkland, WA (US); Jørn Lindhard Mortensen, Redmond, WA (US); Srinivasan Parthasarathy, Redmond, WA (US); Hans Jørgen Grøn, Slangerup (DK)

(73) Assignee: Microsoft Corporation, Redmond, WA (US)

( * ) Notice: Subject to any disclaimer, the term of this patent is extended or adjusted under 35 U.S.C. 154(b) by 402 days.

(21) Appl. No.: 12/098,455

(22) Filed: Apr. 7, 2008

(65) Prior Publication Data
US 2009/0254524 A1    Oct. 8, 2009

(51) Int. Cl.
*G06F 7/00* (2006.01)
(52) U.S. Cl. .............. 707/722; 704/8; 715/265
(58) Field of Classification Search ............ None
See application file for complete search history.

(56) References Cited

U.S. PATENT DOCUMENTS

| | | | |
|---|---|---|---|
| 5,148,541 A | 9/1992 | Lee et al. | |
| 5,442,782 A | 8/1995 | Malatesta et al. | |
| 5,778,356 A | 7/1998 | Heiny | |
| 5,835,912 A | 11/1998 | Pet | |
| 7,318,087 B2 | 1/2008 | Hauduc et al. | |
| 2003/0182632 A1* | 9/2003 | Murdock et al. ............... 715/536 |
| 2005/0004933 A1 | 1/2005 | Potter | |
| 2005/0044065 A1* | 2/2005 | McArdle ............................ 707/3 |
| 2005/0137845 A1* | 6/2005 | Carroll et al. ...................... 704/2 |
| 2006/0047499 A1* | 3/2006 | Chen et al. ......................... 704/8 |
| 2006/0047710 A1 | 3/2006 | Hu et al. | |
| 2006/0074894 A1 | 4/2006 | Remahl et al. | |
| 2006/0149716 A1 | 7/2006 | Polo-Malouvier | |
| 2007/0177993 A1* | 8/2007 | Nakamichi et al. ............. 417/354 |
| 2007/0265827 A1* | 11/2007 | Wall et al. .......................... 704/8 |
| 2007/0266024 A1* | 11/2007 | Cao ................................... 707/6 |
| 2008/0016112 A1* | 1/2008 | Reddy et al. ............... 707/104.1 |

OTHER PUBLICATIONS

Cathy Shea et al., Oracle Database Globalization Support Guide, 10g Release 2 (10.2) Oracle, B14225-02, Dec. 2005.*
"Globalize your On Demand Business" http://www-306.ibm.com/software/globalization/topics/dgw6/kinds.jsp, retrieved by Jan. 9, 2008.
King, "Internationalized Data in Hibernate", Dated: Jul. 12, 2004, http://www.theserverside.com/tt/blogs/showblog.tss?id=HibernateInternational.
Burroughs, et al., "Oracle9i Database README Release Notes", dated 1993, 1996-2001, http://www.acs.utah.edu/acs/systems/ps8/Upgrade_Docs/readmes/README_rdbms.htm.

* cited by examiner

*Primary Examiner* — Vei-Chung Liang

(57) ABSTRACT

Data may be provided in a language chosen by a user. A data record may be stored in a database using symbols to represent data. These symbols may be converted into various languages. A resource file for a given language defines a correspondence between the symbols in the record and the words in that language. A user indicates a choice of language in which to receive data. The user's choice is stored in the database, and conversion information from the resource file for the user's chosen language is copied to the database. When a program connects to a database and requests data records, the user's language choice is retrieved from the data, and the conversion information stored in the database is used to convert the data records into the chosen language. The requested data is then provided to the application in the user's chosen language.

16 Claims, 5 Drawing Sheets

PROVIDING DATA BASED ON LANGUAGE CHOICE

BACKGROUND

A database may be accessed by people who speak various different languages. Business is often conducted across national boundaries and language boundaries. Data may be shared among different participants in the business, so the same underlying data may be accessed by people in different countries who speak different languages.

One or more language packs may be installed for a given computer or application. These language packs generally contain the words, in a particular language, for certain actions or objects. For example, an E-mail program might display a line that contains the subject of an e-mail message. When displaying the subject line, the program may display a label for this line, where the particular label that is shown depends on the language in which the person using the program wants to receive the information. The language pack provides the appropriate word for the label. Thus, for such an E-mail program, the English language pack may indicate that the subject field is to be labeled "subject"; the French and Spanish language packs for the same program may indicate that the same field is to be labeled "sujet" and "sujeto", respectively. Similarly, language packs may be used with databases. For example, "invoice" and "factura" are the English and Spanish words, respectively, for the same accounting concept. Thus, a given field in an accounting database might be labeled "invoice" in English and "factura" in Spanish.

When a database provides data to a client application, the database may provide labels for the data in a symbolic form. For example, the database may indicate that a particular column of data is of type "1". There may be language information available to the client indicating what the number "1" means in different language—e.g., that "1" means "invoice" in English, "factura" in Spanish, etc. The client may allow a user to switch between different languages, or may be able to use a default language choice that has been pre-specified. However, in this scenario the database does not serve content in a user's chosen language. Normally, the database is not aware of the user's chosen language. Thus, the database serves content in symbolic form, and it is the client that converts the symbolic information into a language.

SUMMARY

A database may provide content in a user's chosen language. The database may store a record that associates a language choice with a particular user. When the user logs on to the database, the database may look up the user's language choice based on the logon credentials. Language conversion information, such as a language-pack resource file, may be used to convert the symbolic information in data records into the user's chosen language.

A user may specify an explicit language choice, or the user's choice of language may be inferred from the language of a query that the user issues to obtain the data records. When the database has ascertained the user's language choice, the database may store an association between the user and the language choice, so that choice may be used for future requests from the same user. Also, when the language choice is ascertained, the database may determine whether it has a local copy of the conversion information (e.g., resource file) for that language. If the conversion information does not exist on the database, then the database may obtain the conversion information from the user's client or machine. For example, the database may copy, from the client, the language-pack resource file the user's chosen language.

When a language choice has been registered for a user and the database has the appropriate language conversion information, the database may serve content to a client in the user's chosen language. For example, a spreadsheet file may contain a connection to a database as a source of data. When the spreadsheet filed is opened by a spreadsheet program on behalf of a particular user, the user's logon credentials may be provided to the database in order to obtain the data that is referenced in the spreadsheet file. When the database serves the data, it may look up the user's language choice based on the logon credentials, and may serve data to the client in that chosen language.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
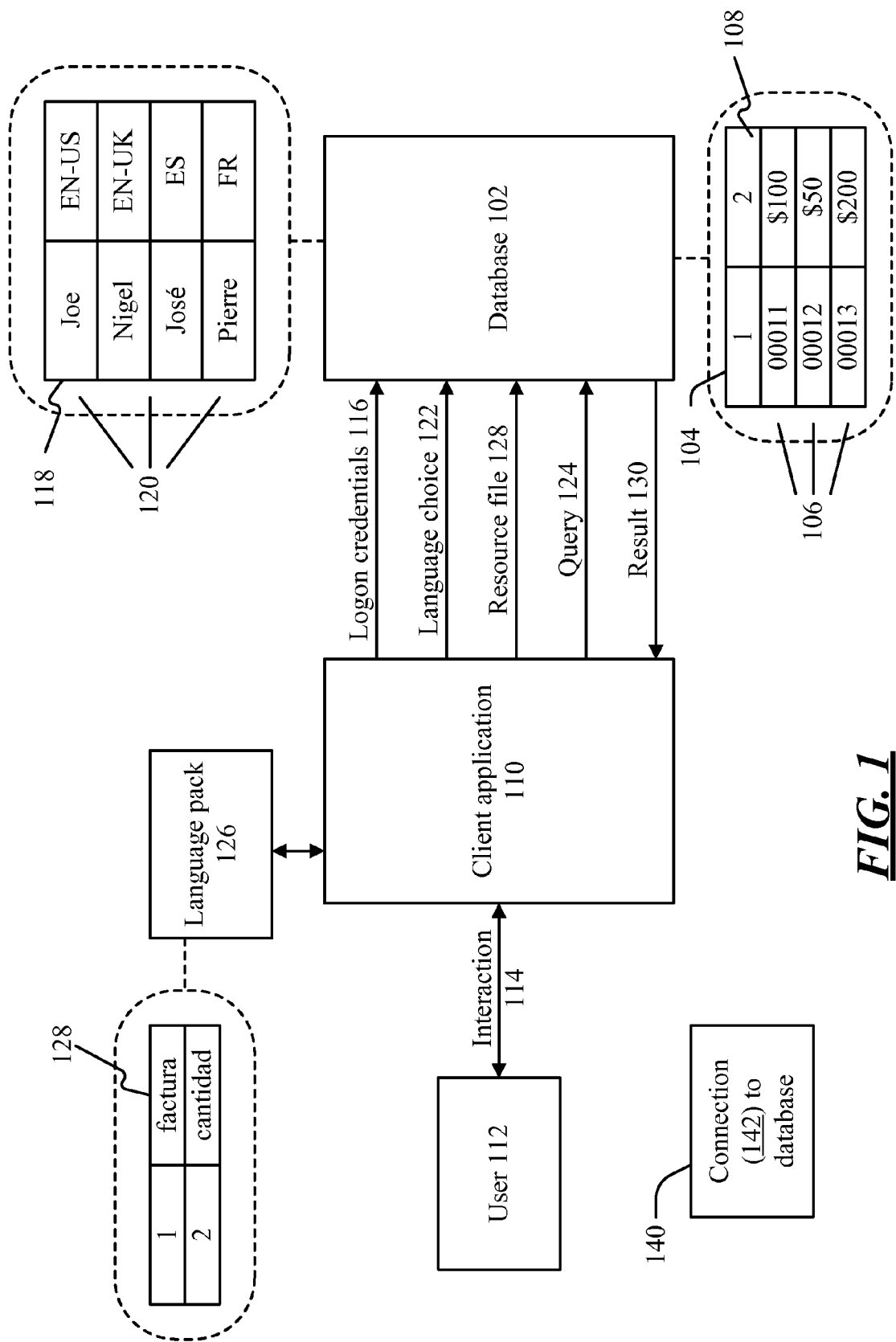
FIG. 1 is a block diagram of an example scenario in which a database provides content in a particular language.

People who speak different languages may access the same data. Business is often transacted across national and language boundaries, so people may wish to access the same accounting records, medical records, legal records, etc., in different languages.

In a database, many data may have descriptive labels. For example, a data element is normally associated with a type or attribute. In a tabular representation of data, this type or attribute appears as the column header, which is often a verbal name or label. For example, a banking database might have a table with three columns representing a customer's name, branch, and account number. The words that are used to label these columns would be different in different language—e.g., "name" in English, "nom" in French, "nombre" in Spanish, etc. In addition to data attributes, the data elements themselves could have different representations in different languages. For example, a column of data may contain Boolean values, which could be represented as "true" and "false" in English, "vrai" and "faux" in French, etc.

Data is often stored in the database in a symbolic representation. For example, in the above-mentioned banking table, the column that contains names could be labeled "1", the column that contains branches could be labeled "2", etc. Particular concepts that are relevant to particular types of data (e.g., invoices, payments, accounts, etc.) could be assigned particular symbolic representations, numeric or otherwise. As another example, the Boolean values true and false could be represented as "0" and "1". Or, symbols could be assigned to particular data types or attributes.

Databases are often accessed through client applications. For example, a spreadsheet, an accounting program, an inventory program, etc., may retrieve data from the database. Such a program may present the data to a user in some way, or may facilitate some type of interaction with the data. These programs may employ a language pack to convert symbol in the database into the symbols (e.g., words) of a particular language. Such a language pack may have a label indicating the language and/or country to which the language pack applies (e.g., "English—United States", or "English—United Kingdom"). The language pack may also have a resource file, which describes how symbolic information in the database is to be converted into a particular language. For example, the resource file may contain associations between symbols in the database and words in the language (e.g., "1"=="name", "2"=="branch", etc.). The application may allow a user to switch between languages (if the appropriate language packs for the various languages are installed on the computer on which the language pack is to be used), or may present data based on a pre-selected language. These translations are generally performed by the client application using the language pack. The database typically does not serve content that is "localized" for a particular user in a particular language, since the database does not know the user's language choice and typically does not have the resource file or other language-conversion information.

In one example, the subject matter described herein may allow the database to provide such localized content based on a particular user's language choice. The database may identify the user based on the logon credentials that are used to access the data. The database may store an association between a particular user and that user's language of choice. The database may store the resource file for that language, and may obtain the resource file from the user's client if the database does not already have the resource file. The database may use the resource file to convert the symbols in data records into a particular language, and may then serve content to a client in that language. Data that has been converted to a particular language could be stored in the database for future use. Or, the data could be re-converted each time the data is demanded.

Turning now to the drawings, FIG. 1 shows an example scenario in which a database may provide content in a particular language. Database 102 stores various types of data records, and has functionality to provide data based on those records in response to a query or other type of request. For example, database 102 may store a table 104. Table 104 may contain various data records 106. Each of data records 106 is a row of table 104. Each of the columns in table 104 may have an attribute, sometimes referred to as the column name or column header. In table 104, attributes 108 are referred to by the symbols "1" and "2". Table 104, in this example, is a table of invoices and their amounts. The column labeled "1" represents invoice numbers (e.g., "00011"). The column labeled "2" represents the amount of an invoice (e.g., "$100"). As discussed below, a resource file could be used to convert "1" into the appropriate English word ("invoice"), the appropriate Spanish word ("factura"), or the appropriate word in any other chosen language.

Database 102 may be accessed by or through client application 110. Client application 110 could be any type of application. For example, client application 110 may be a spreadsheet program that presents, and allows interaction with, data that is specified in a spreadsheet file 140. Spreadsheet file 140 could specify a connection 142 to database 102, so that database 102 would be a source or data for that spreadsheet file. Thus, a spreadsheet program is an example of a client application that accesses data from database 102. An accounting program (such as MICROSOFT OFFICE ACCOUNTING) could access business data that is stored in database 102, and is thus another example of client application 110. A delivery company may use database 102 to store tracking information about packages. A courier may use a handheld device to interact with this information (e.g., to retrieve information about packages, or to register the fact that a package has been delivered), in which case the software that runs on the handheld device is an example of client application 110. Moreover, a plug-in or add-on to another application could access database 102, in which case such plug-in or add-on would be an example of application 110. Any type of software that interacts with data in database 102 could be an example of client application 110.

User 112 is a person or other entity that operates client application 110. User 112 could be any type of human or non-human entity that operates application 110—e.g., a person who operates a computer for personal or business use, an Information Technology (IT) administrator, a "bot", etc. User 112 engages in some type of interaction 114 with client application 110. Interaction 114 may be performed through a keyboard, pointing device, touch-screen, barcode reader, or any other type of mechanism.

The data stored in database 102 may be protected by a mechanism that either grants or denies access based on a particular entity's authorization to access the data. Thus, database 102 may collect logon credentials 116 before allowing a client to access data stored in database 102. Logon credentials 116 identify a particular user that is requesting access to the data. Database 102 may use this information about a user's identity to store a language choice for that user. For example, users with the logon identifiers "Joe", "Nigel", "José", and "Pierre" may all have accounts with database 102. These users may be from the United States, the United Kingdom, Spain, and France, respectively. Database 102 may obtain, for each user, a language choice. This language choice may be recorded, for example, in table 118, which may be stored in database 102. Table 118 may contain data records 120, which indicate the various users' respective language choices—e.g., United States English ("EN-US") for Joe, United Kingdom English ("EN-UK") for Nigel, and so forth. Table 118 may be stored in a file or in some other manner.

The language choice may be obtained in any manner. For example, user 112 could explicitly provide the user's language choice 122 to database 102. Or, user 112 could submit a request to obtain data records from database 102 (such as query 124), and the user's language choice could be inferred from the language in which that request is written. An explicit choice of language, and a request from which a language choice may be inferred, are both examples of an indication of user 112's language choice.

A client may have a language pack 126, which includes a resource file 128. Resource file 128 is an example of conversion information that may be used to convert symbolic information into a particular language. Resource file 128 may provide associations between symbols or elements of a data representation (such as the numbers used in attributes 108) and elements in a particular language. (The words in a particular language may be viewed as the symbols, or elements, of that language. Thus, resource file 128 may viewed containing a correspondence between one set of symbols and another set of symbols.) For example, as noted above, the symbols "1" and "2" in table 104 may represent the English concepts of "invoice" and "amount." Resource file 128 may provide support for the Spanish language, and thus may define a correspondence such as "1"="factura", "2"="cantidad", etc. The symbol "1" and "2" could be used as keys to look up corresponding Spanish words in resource file 128. When database 102 receives a language choice for a particular user, it may determine whether it has the appropriate conversion information for the chosen language. If database 102 does not have the appropriate conversion information, it may obtain that conversion information. Resource file 128 is an example of the conversion information. Database 102 may obtain the resource file 128 (or other conversion information) by requesting the file from client application 110, or a machine on which client application 110 runs. Once database 102 has received resource file 128 (or other conversion information), that resource file may be stored in database 102.

Database 102 may receive a query 124, or other type of request to provide a data record. Database 102 may provide a result 130 in response to query 124. Result 130 may comprise, for example, one or more data records that are stored in database 102, or a representation of those records in some language. For example, in response to a query that seeks a set of invoices and their amounts, database 102 could provide table 104, including the symbolic column headers (attributes 108). The column headers could then be converted into a language by client application 110 using a language pack. However, if database 102 has received a particular user's choice of language and the appropriate conversion information (e.g., resource file 128), database 102 may provide a representation of table 104 in the appropriate language—e.g., a table that is based on table 104, but that has names in some language substituted for the symbolic column headers. A table that has been converted in this way is a representation of the original table 104, in the sense that the converted table may not have exactly the same information as the original table 104 (e.g., the column headers may be names instead of symbols), but a table that results from such a conversion, nonetheless, represents the information in table 104. The converted column headers from table 104 are examples of records that have been converted from a symbolic form into a particular language.

Figure 2:
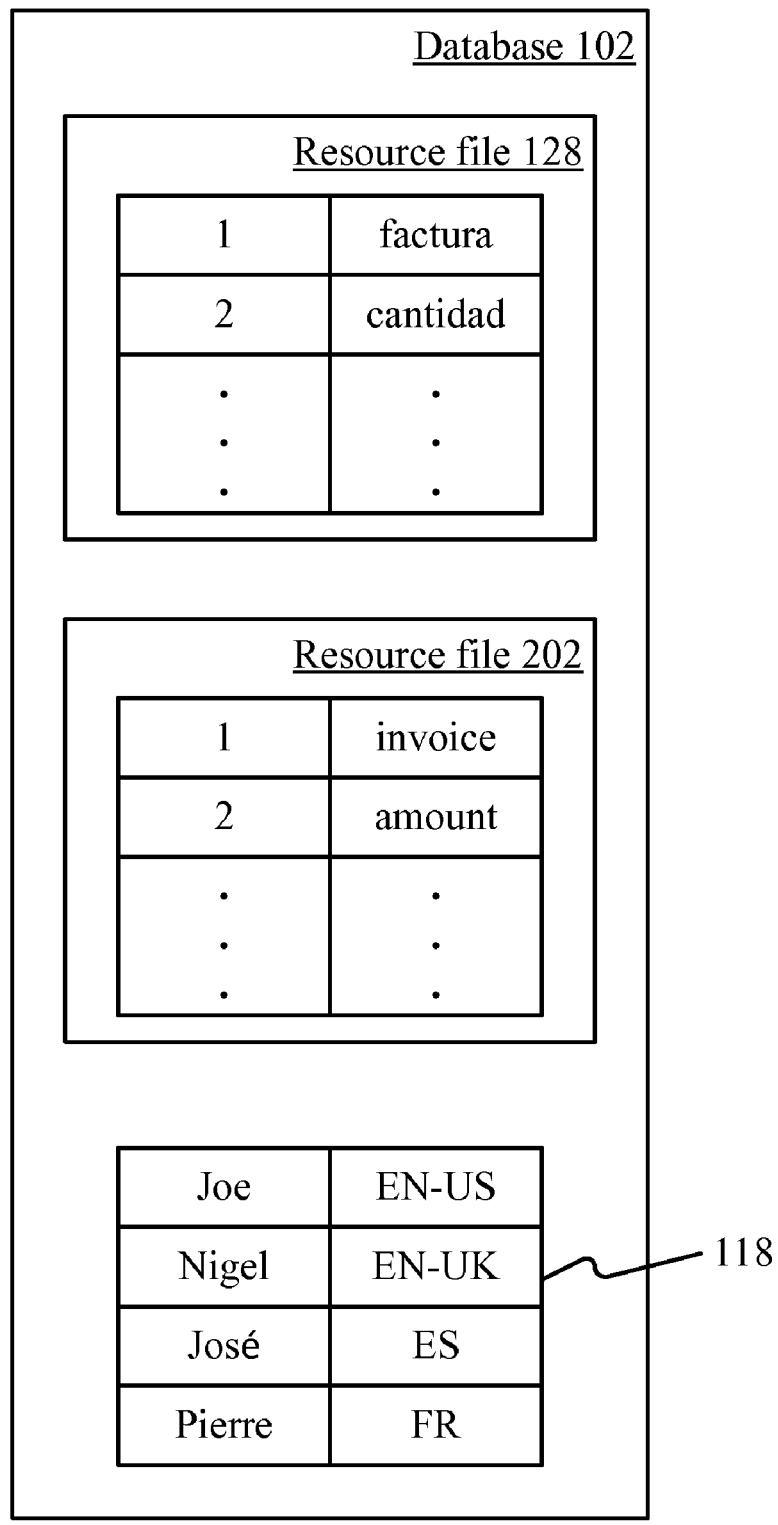
FIG. 2 is a block diagram of a database and some example contents thereof.

FIG. 2 shows database 102 and an example of some of its contents, after language choices for various users have been registered. In the example of FIG. 2, language choices have been registered for four users: Joe (United States English, or "EN-US"), Nigel (United Kingdom English, or "EN-UK"), Jose (Spanish, or "ES"), and Pierre (French, or "FR"). These choices are stored in table 118. The resource files for each of the user's language choices may also be stored in database 102. For example, resource file 128 (which is the resource file for Spanish), and resource file 202 (which is the resource file for United States English) may be stored in database 102. Resource files could also be stored for French, and for United Kingdom English. (The United Kingdom English file may contain the same words as the United States English file, or could contain slightly different words, or versions of words, to reflect differences in dialect or spelling between the two countries).

Figure 3:
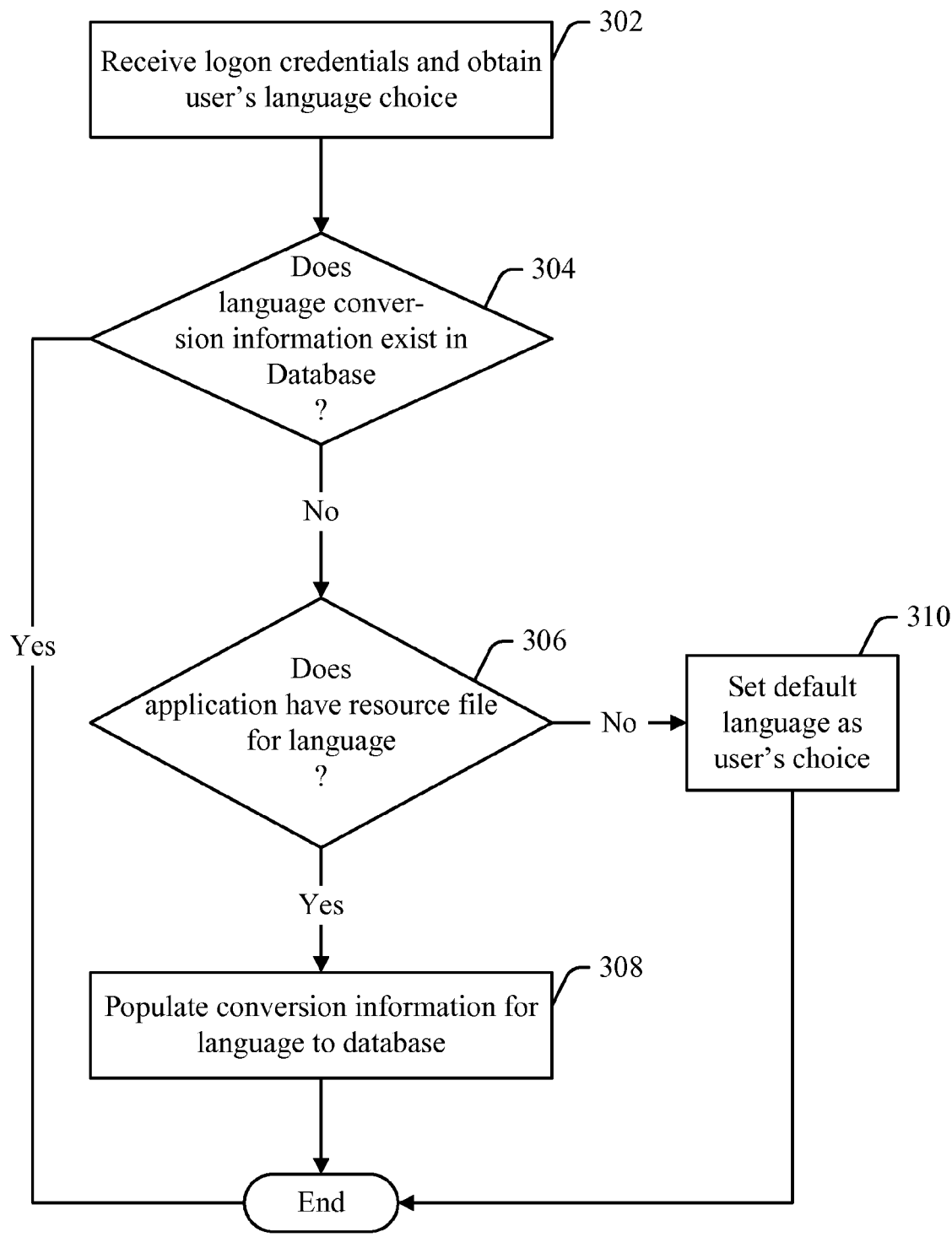
FIG. 3 is a flow diagram of an example process in which a language choice is registered in a database.

FIG. 3 shows an example process in which a language choice is registered in a database. The process of FIG. 3 (as well as that of FIG. 4) is described, by way of example, with reference to components that are described herein, although these processes may be carried out in any system. Additionally, each of the flow diagrams in FIGS. 3 and 4 shows an example in which stages of a process are carried out in a particular order, as indicated by the lines connecting the blocks, but the various stages shown in these diagrams can be performed in any order, or in any combination or sub-combination.

At 302, a user's logon credentials are received, and the user's language choice is obtained. As previously noted, the user could make an explicit choice of language, which is one example of how a language choice could be received. As another example, a determination as to the user's language choice could be inferred from the language in which a request for data is made, such as the language of a query. If conversion information for that language exists in the database (as determined at 304), then the process ends. If the conversion information for that language does not exist, then it is determined whether the application has conversion information (such as a resource file) for the language (at 306). If the language does have such conversion information, then the conversion information for the language is populated to the database (at 308). If no conversion information is available in the database or from the application, then a default language (e.g., United States English) may be set as the user's choice (at 310).

Figure 4:
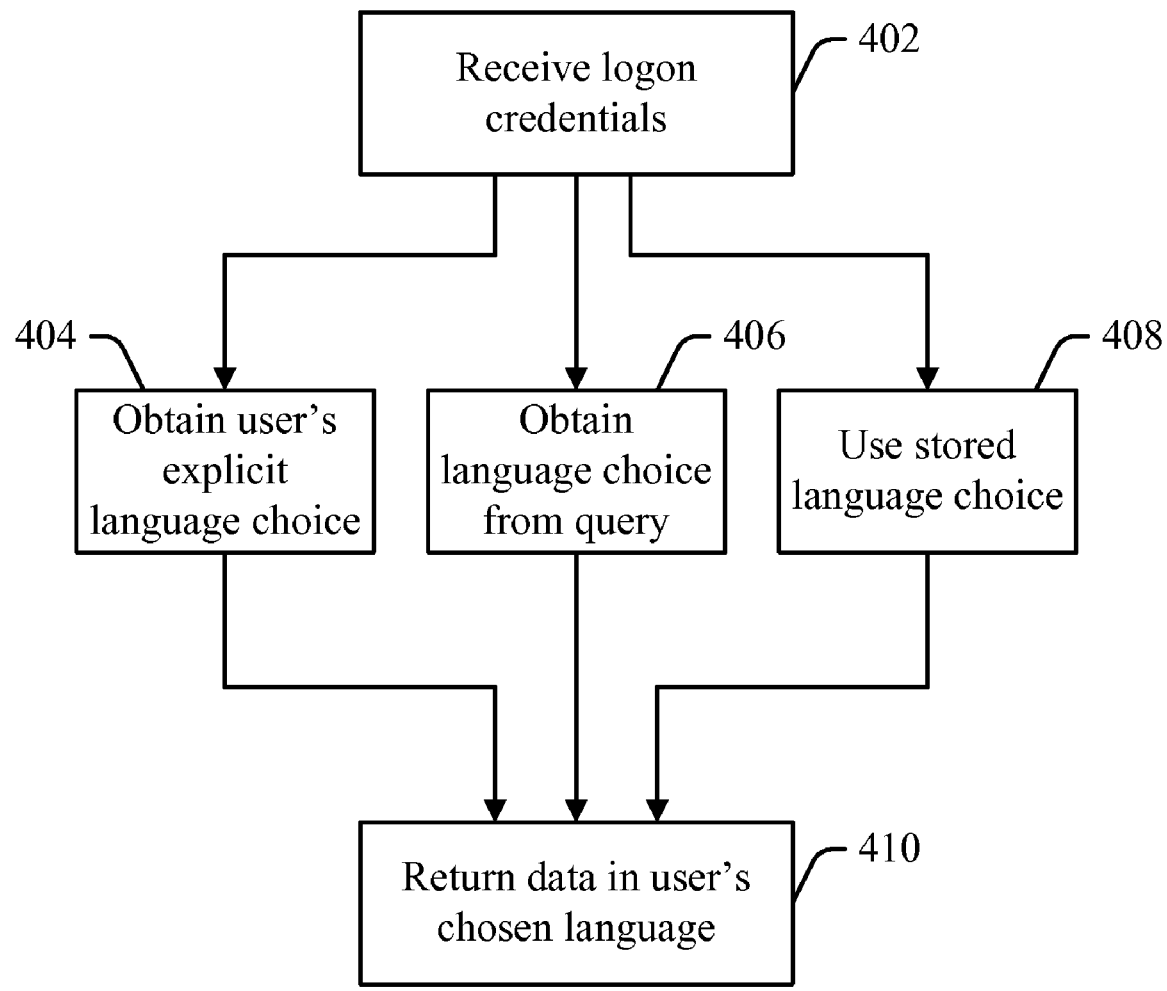
FIG. 4 is a flow diagram of an example process in which a database provides information in a user's chosen language.

FIG. 4 shows an example process in which a database provides information in a user's chosen language. At 402, the user's logon credentials are received. The user's language choice is then obtained either from an explicit choice made by the user (at 404), by inference from a query (at 406), or from a stored choice that the user has previously made (at 408). When the user's language choice has been obtained, the database record requested by the user may be retrieved and converted into the chosen language. The converted records may then be provided (at 410) to the application through which the user requested the records (or to the machine on which that application runs).

Figure 5:
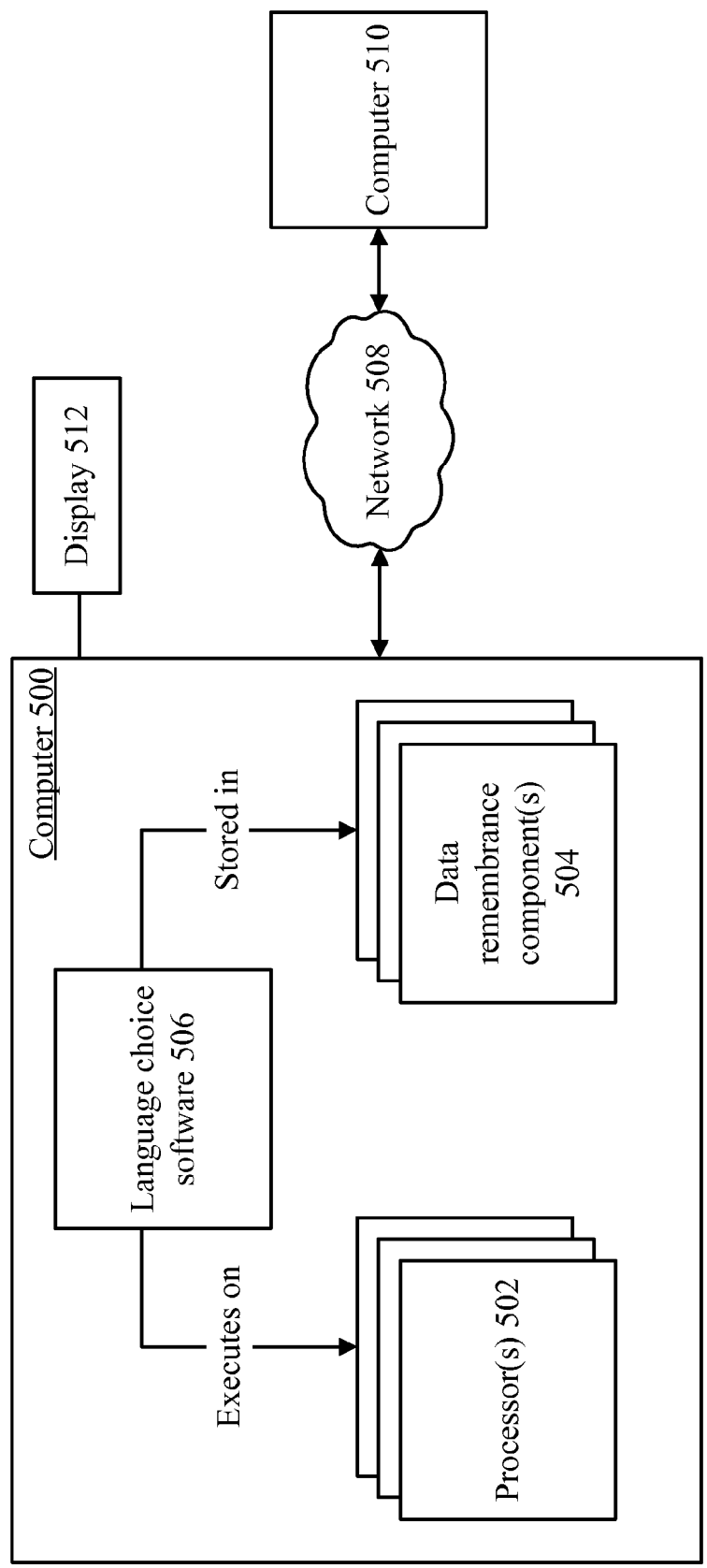
FIG. 5 is a block diagram of example components that may be used in connection with implementations of the subject matter described herein.

FIG. 5 shows an example environment in which aspects of the subject matter described herein may be deployed.

Computer 500 includes one or more processors 502 and one or more data remembrance components 504. Processor(s) 502 are typically microprocessors, such as those found in a personal desktop or laptop computer, a server, a handheld computer, or another kind of computing device. Data remembrance component(s) 504 are components that are capable of storing data for either the short or long term. Examples of data remembrance component(s) 504 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 500 may comprise, or be associated with, display 512, which may be a cathode ray tube (CRT) monitor, a liquid crystal display (LCD) monitor, or any other type of monitor.

Software may be stored in the data remembrance component(s) 504, and may execute on the one or more processor(s) 502. An example of such software is language choice software 506, which may implement some or all of the functionality described above in connection with FIGS. 1-4 (such as assessing and applying language choices, managing the database 102 that is shown in FIG. 1, or any other functionality), although any type of software could be used. Software 506 may be implemented, for example, through one or more components, which may be components in a distributed system, separate files, separate functions, separate objects, separate lines of code, etc. A personal computer in which a program is stored on hard disk, loaded into RAM, and executed on the computer's processor(s) typifies the scenario depicted in FIG. 5, although the subject matter described herein is not limited to this example.

The subject matter described herein can be implemented as software that is stored in one or more of the data remembrance component(s) 504 and that executes on one or more of the processor(s) 502. As another example, the subject matter can be implemented as software having instructions to perform one or more acts of a method, where the instructions are stored on one or more computer-readable storage media. These instructions, when executed, may cause a computer to perform a method. The instructions to perform the acts could be stored on one medium, or could be spread out across plural media, so that the instructions might appear collectively on the one or more computer-readable storage media, regardless of whether all of the instructions happen to be on the same medium.

In one example environment, computer 500 may be communicatively connected to one or more other devices through network 508. Computer 510, which may be similar in structure to computer 500, is an example of a device that can be connected to computer 500, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable memories comprising executable instructions to cause a computer to perform a method, the method comprising:
   receiving, from a user of the computer, an explicit choice of language;
   providing, from an accounting application program that executes on said computer to a database that stores a first representation of a first data record, said choice of language, said first representation of said first data record being in a numeric form and not being written words of a spoken language;
   submitting, from said accounting application program, a query to said database;
   receiving, from said database, a request to provide information that describes how to convert from said first representation into said language;
   providing, to said database, a first file that defines a correspondence between first elements of said first representation and second elements of said language, wherein said first file is provided in response to said request, said first elements being numbers that represent concepts, said second elements being words in said language, said first file containing a table that indicates which of the numbers corresponds to a particular word in the language;
   receiving from said database, in response to said query, a second representation of said first data record, said second representation being in said language and comprising one of said second elements, said one of the second elements being one of the words in the language; and
   determining said user's choice of language based on a logon credential that is associated with said user, and that said database collects before allowing said user to access data in said database.

2. The one or more computer-readable storage memories of claim 1, wherein a second file defines a correspondence between a plurality of users and said plurality of users' respective language choices, said user being one of said plurality of users, and wherein the method further comprises:
   determining said user's choice of language based on said second file and based on said logon credential.

3. The one or more computer-readable storage memories of claim 1, wherein the method further comprises:
   installing, on the computer, a language pack that comprises (a) a label that indicates said language, and (b) said first file.

4. The one or more computer-readable storage media of claim 1, said accounting application program being a plug-in to a different application program.

5. A method of providing, in a language, a first data record that is stored in a database, the method comprising:
   determining that said first data record is to be provided to a client application program in said language, said client application program being an accounting application, said first data record comprising a number that represents a concept that said first data record does not represent in the form of words of a spoken language, said determining that said first data record is to be provided in said language being made based on a logon credential of a user, said user having previously indicated an explicit language choice to be associated with said logon credential, said database collecting said logon credential before allowing said user to access data in said database;
   determining that conversion information for said language is not stored in said database;
   receiving said conversion information either from said client or from a device on which said client operates, said conversion information comprising a table that defines a correspondence between (a) numbers and (b) words in said language, said table containing a plurality of rows, each of said rows comprising (a) a number that is used in said first data record to represents a concept and (b) a corresponding word in said language;
   installing said conversion information in said database;
   using said conversion information, from said database, to convert said first data record into said language by converting a number in said first data record into a word in said language; and
   providing, to said client, a representation of said first data record in said language.

6. The method of claim 5, further comprising:
   receiving, from said client, an indication that said language has been chosen as the language in which to receive data from said database, wherein a determination that said first data record is to be provided to said client in said language is made based on said indication.

7. The method of claim 5, further comprising:
   receiving a query from said client, wherein said representation of said first data record is provided in response to said query.

8. The method of claim 5, further comprising:
   receiving, from said client, a query in said language, wherein a determination that said first data record is to be provided to said client in said language is made based on said query's being in said language.

9. The method of claim 5, further comprising:
   receiving a logon credential from said client or from said device;
   receiving, from said client, an indication that said language has been chosen as the language in which to receive data from said database; and
   storing, in said database, an association between said language and said logon credential.

10. The method of claim 5, wherein said first data record comprises a first symbol that is one of a first plurality of symbols, wherein said language comprises a second plurality of symbols, wherein said conversion information comprises a second data record that defines a correspondence between said first symbol and a second symbol, said second symbol being one of said second plurality of symbols, and wherein said using of said conversion information comprises:

looking up said second data record based on said first symbol.

11. The method of claim 5, wherein said client comprises an application that presents data stored in said database.

12. The method of claim 5, said client application being a plug-in to a different application program.

13. A system comprising:

a processor; and one or more executable components that execute on said processor, that manage a database in which a data record is stored, that retrieve said data record in response to a query, that receive an indication of a language in which data is to be provided to an accounting application client program that connects to said database in order to retrieve records from said database, that determine whether conversion information that describes how to convert said data record into said language is stored in said database, that obtain said conversion information from said accounting application client program, or from a machine on which said program runs, that convert said data record to a representation in said language using said conversion information, and that provide said representation to said program;

said data record stored in said database containing representations of concepts in numeric form rather than as words in any spoken language;

said indicating of said language in which data is to be provided being in a form of a logon credential associated with a user, said database collecting said logon credential before allowing said user to access data in said database, said user having explicitly specified that said language is to be associated with said logon credential;

said conversion information comprising a table that defines a correspondence between numbers that represent said concepts and words in said language in which data is to be provided;

conversion of said data record being performed by converting numbers in said data record to corresponding words in said language as defined by said table;

said conversion information comprising a file that defines a correspondence between a number that is used in said data record and a word that is part of said language, said file being part of a language pack that is installed on said machine, said language pack comprising said file and a label that describes said language.

14. The system of claim 13, wherein said one or more executable components receive, from said accounting application client program or said machine, said logon credential, and store an association between said logon credential and said language.

15. The system of claim 13, wherein an association between (a) said logon credential of said user, and (b) said language, is stored, and wherein said one or more executable components uses said association to determine that said data record is to be converted to said language.

16. The system of claim 13, said accounting application client program being a plug-in to a different application program.

\* \* \* \* \*